United States Patent [19]

Ishman et al.

[11] Patent Number: 4,612,575
[45] Date of Patent: Sep. 16, 1986

[54] T.V. VIDEO IMAGE CORRECTION

[75] Inventors: Neal H. Ishman, Springfield; William S. Alderson, Manassas, both of Va.

[73] Assignee: E-Systems, Inc., Dallas, Tex.

[21] Appl. No.: 633,923

[22] Filed: Jul. 24, 1984

[51] Int. Cl.⁴ .......................... H04N 5/14; H04N 5/21
[52] U.S. Cl. ..................................... 358/160; 358/105; 358/166; 358/167
[58] Field of Search ................ 358/105, 160, 166, 167

[56] References Cited

U.S. PATENT DOCUMENTS 4,517,599   5/1985   Zwirn et al. ........................ 358/166

Primary Examiner—James J. Groody
Assistant Examiner—Michael D. Parker
Attorney, Agent, or Firm—Albert M. Crowder, Jr.

[57] ABSTRACT

A video camera image with a motion induced blurring component is corrected by measuring the motion of the video camera by orthogonally mounted rate gyros each producing a signal that varies with camera motion along a defined axis relative to the bore sight of the camera. The video camera signal with the motion induced blurring component is processed into a Fourier transform which is combined with a video deblurring signal. Motion output signals of the rate gyros are processed in a Fourier transform computed Wiener filter to produce the video deblurring signal which is combined with the Fourier transform of the video camera signal. This combination signal is then processed in an inverse Fourier transform and converted into an analog signal for input to a video display monitor. This input signal to the video display monitor is motion corrected and produces a video display corrected for motion of the video camera.

28 Claims, 4 Drawing Figures

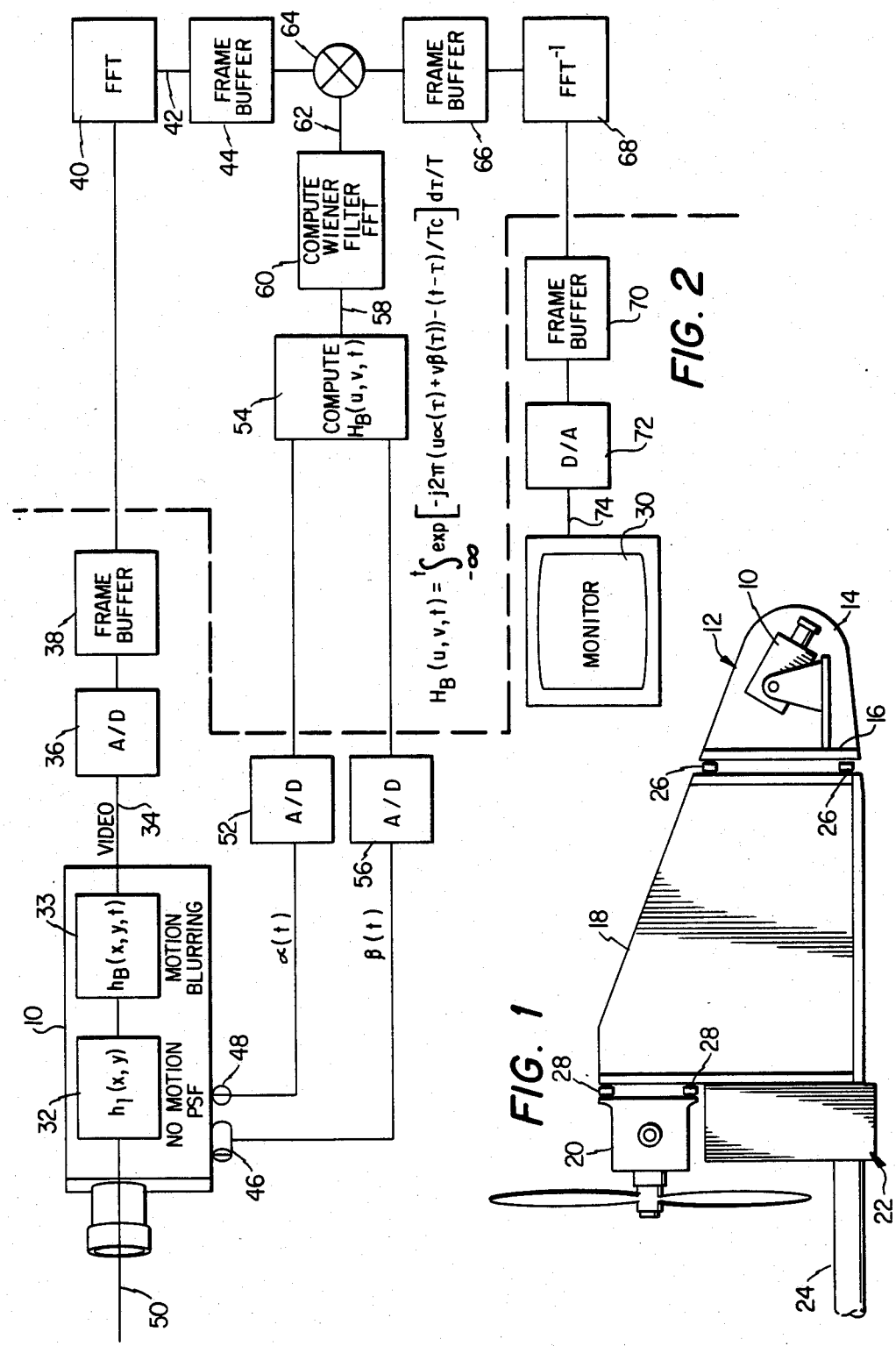

T.V. VIDEO IMAGE CORRECTION

This invention relates to apparatus and a process for correcting a T.V. video image for motion induced blurring, and more particularly to a method and apparatus for combining the signal of a blurred video image with a measure of the camera bore-sight angular motion to generate a motion corrected video image.

BACKGROUND OF THE INVENTION

Motion induced blurring of a video image has been recognized as a problem particularly with video images attained from small cameras such as carried by many observation vehicles. The problem is apparently more acute in special purpose video observation than in commercial television which can tolerate some blurring. Specifically in the area of military reconnaissance the blurring of a video image is extremely detrimental for target identification. Several techniques have been developed to minimize the blurring of the images resulting from camera angular motion.

One technique for reducing the blurring of video images is to shock mount the video camera to minimize high frequency vibrations which have been identified as a major source of motion induced blurring. Also in an effort to produce motion free video images the bore sight of the camera is gyro stabilized by a servo control having motors for controlling the angular position of two mirrors each mounted on an axis perpendicular to the camera bore sight. It will be readily recognized that the use of servo control techniques for stabilization is costly and results in a rather heavy system. While weight may not be an important factor when a camera is mounted on a pylon, for portable and vehicle mounted video cameras, weight is a factor that must be considered.

While the present invention is not limited to a specific application, in the field of remote pilotless vehicles the added weight and cost caused by inertially controlling the bore sight of the video camera by gyro stabilization of mirrors imposes severe difficulties in field launching and logistics. Also, a remote pilotless vehicle (RPV) is considered an expendable vehicle and the cost of such gyro stabilization of mirrors on orthogonal axis restricts the use of this form of reconnaissance.

SUMMARY OF THE INVENTION

Deblurring of a video image in accordance with the present invention is achieved by shock mounting the camera to minimize high frequency vibration effects and to mount rate gyros on orthogonal axis on the camera to produce measures of camera motion which are processed to remove a motion induced blurring component from the camera video image. Both the video camera signal with the motion blurring component and the rate gyro signals are input to a processing system that combines the video camera signal with the blurring component and the rate gyro signals to produce a motion corrected video image. The technical advantage resulting from the present invention is an inexpensive and lightweight camera system capable of producing a motion corrected video image. The technical improvement is a less complex motion correction system that reliably produces a motion corrected video image.

In accordance with the present invention, there is provided a method for correcting a video image (signal) for motion induced blurring that includes a first step of measuring the motion of a video camera and generating a motion signal related to camera movement. A video camera signal is generated by the video camera with this video signal including a blurring component caused by camera motion. From the motion signal, there is computed a video deblurring signal which is combined with the video camera signal to generate a motion corrected video signal. This motion corrected video signal may then be an input to a display system for producing to an observer a motion corrected video display.

Also in accordance with the present invention there is provided apparatus for correcting a video signal for motion induced blurring. Such apparatus includes a video camera that has means for generating a video camera signal, where the video camera signal has a motion blurring component. Movement of the video camera is measured by means that responds to the motion and generates a motion signal. This motion signal along with the video camera signal are input to a signal correcting processing systems that respond to both inputs which are combined into a motion corrected video signal. Again, the video signal may be input to a display system for producing a motion corrected video display.

In one embodiment of the present invention, both the apparatus and the method utilizes filtering techniques for combining the video deblurring signal with the video camera signal in the generation of the motion corrected video signal. One filtering techniques includes computing a fast Fourier transform of a Wiener filter and combining this output with the Fourier transform of the video camera signal with the motion blurring component. For frame by frame processing of a video signal, a synchronization signal routes the individual frames of data to the centralized processing signal system for generating the video display.

BRIEF DESCRIPTION OF THE DRAWINGS

A more complete understanding of the invention and its advantages will be apparent from the following detailed description taken in conjunction with the accompanying drawings.

Referring to the drawings:

FIG. 1 is a partial schematic of a remote pilotless vehicle (RPV) with a forward looking shock mounted video camera;

FIG. 2 is a block diagram of a system for deblurring the output of a video camera having a motion induced component;

DETAILED DESCRIPTION

Figure 3:
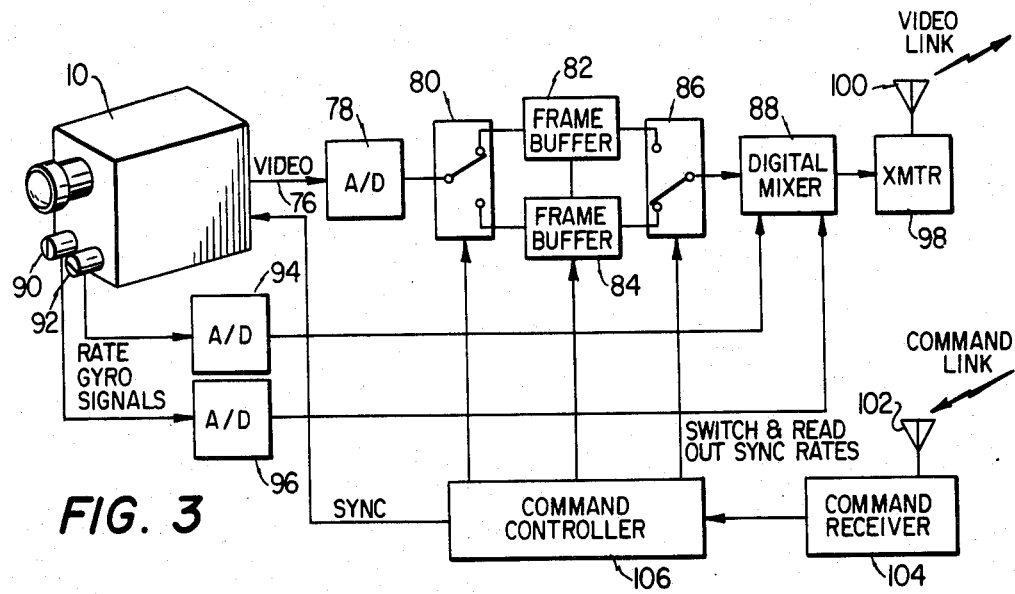
FIG. 3 is a block diagram of an airborne video signal processing system such as utilized in the remote pilotless vehicle of FIG. 1.

Video cameras are finding extensive use in applications where the camera is subject to vibrations which induce into the output signal of the camera a motion component that causes blurring of the video display. While most commercial television can tolerate this blurring of the video display, it can be extremely detrimental for other applications such as the use of a video camera in reconnaissance aircraft. With reference to FIG. 1, there is shown a partial schematic of a remote pilotless vehicle (RPV) wherein a video camera 10 is mounted in a camera compartment 12 comprising a transparent cover 14 mounted to a base plate 16. The base plate 16 is shock mounted to a control compartment 18 that includes various navigation and engine controls along with circuitry of the present invention as will be described. Mounted to the rear of the control compartment 18 is the vehicle engine 20 which is also shock mounted to the control compartment 18. The elements 22 and 24, as illustrated in FIG. 1, refer to various standard components of an RPV which forms no part of the present invention and will not be further described.

To minimize high frequency vibration effects on the camera 10, such as caused by the engine 20, the base plate 16 is mounted to the control compartment 18 by means of shock mounts 26. Such mounts are conventional hardware and have been heretofore used to minimize the high frequency effects on a video camera. Similarly, the shock mounts 28 between the engine 20 and the control compartment 18 are also conventional and designed to minimize the transmission of high frequency vibrations from the engine to the control compartment.

To further minimize the effect of motion of the camera 10 on a display screen, the video signal output from the camera is processed by Fourier transform and Wiener filter techniques.

Referring to FIG. 2, there is shown a system for deblurring the output of the video camera 10 to produce a motion deblurred signal to a video monitor 30. As illustrated in the block identified as camera 10, block 32 comprises a conventional video camera that generates a video signal that is in essence the scene image passed through the system processing function, $h_1(x,y)$, yielding a signal that would offer adequate image fidelity when reconstituted for display. If the camera 10 is subject to motion, there is in essence an additional undesirable processing filter as given by the expression: $h_B(x,y,t)$. Thus the video signal output of the camera 10 as appearing on cable 34 has both the video component as generated by a conventional video camera and a motion induced component, such as given by the expression $h_B(x,y,t)$. This video signal on cable 34 is input to an analog to digital converter 36 that digitizes the analog output of the camera 10 for processing to remove the motion induced component.

Following the converter 36 the video signal with the motion induced component is input to a frame buffer 38 as a memory element to receive data in real time from the converter 36. This data is stored for processing on a demand basis in a fast Fourier transform network 40. The fast Fourier network 40 is conventional hardware implemented with "butterfly" elements such as understood by those skilled in the art. An output of the network 40 as appearing on a line 42 is the transform of the output of the video camera 10 on the cable 34 which includes a motion induced component. This transform is put through a frame buffer 44, again a memory element such as the frame buffer 38. Frame buffers 38 and 44 and other frame buffers in the circuit of FIG. 2 are utilized because of processing limitations of the various transform and filter networks included within the system.

Mounted to the camera 10 at mutually perpendicular axis are rate gyros 46 and 48. These gyros are also perpendicular to the line of sight 50 of the camera 10. Each of these gyros generates a signal varying with the motion of the camera 10 along the respective axis of the gyro. A signal from the gyro 48 is input to an analog to digital converter 52 wherein it is digitized and applied to a computing network 54 that generates a motion signal in the frequency domain as will be explained. The output of gyro 46 is passed through an analog to digital converter 56 and also applied to the computing network 54.

In the camera 10 there is identified a motion related function within the block 33. This function identifies the motion component of the video signal on the cable 34 in the spatial domain. To calculate out this motion induced component a similar function is generated from the outputs of the gyros 46 and 48 in the frequency domain. The computing network 54 then generates a motion related signal in the frequency domain which is similar to the motion component of the video signal in the spatial domain on the cable 34. Thus, the output of the computing network 54 on line 58 is a signal which tracks the motion component of the video signal on the cable 34 as given by the expression in the block 33.

Typically, the computing network 54 is a programmed computer that generates the function $H_B(u,v,t)$ which varies with the camera charactistics. For example, for one model of video camera the computing network 54 generated the signal $H_B$ in accordance with the following expression:

$$H_B(u,v,t) = \int_{-\infty}^{t} \exp[-j2\pi(u\alpha(\tau) + v\beta(\tau)) - (t - \tau)/T_c]d\tau/T_c$$

where each of the terms of the expression are given in FIG. 2.

From the computing network 54 the signal generated on the line 58 is applied to a Wiener filter 60. Thus, there is input to the Wiener filter 60 a signal which varies with the motion of the camera 10 as detected by the rate gyros 46 and 48. This signal input to the filter 60 is processed in accordance with the expression:

$$\frac{H_B}{|H_B|^2 + N_n/N_s}$$

Where the term $N_n/N_s$ is a noise-to-signal power ratio.

As such, the output of block 60 is the Fourier transform of the Wiener filter which minimizes the mean square error between an assemble of the blurred image and the desired image. The output of the block 60 on output line 62 is combined by multiplication with the Fourier transform of the blurred image at the output of the frame buffer 44.

It should be noted that the expression for the Wiener filter as given above is in agreement with a solution commonly found in the literature. At the output of the Wiener filter 60 and the frame buffer 44, there are now two signals which when combined will produce a video signal with the motion induced component minimized and a deblurred video display will appear on the monitor 30.

The output of the frame buffer 44 and the Wiener filter 60 are combined in a multiplier 64 on a term by term basis with the result applied to a frame buffer 66. Again, the frame buffer 66 is a memory element to store the output of the multiplier 64 for further processing. This further processing includes an inverse fast Fourier transform network 68 which generates a video image in the spatial domain with an optimally reduced blurring.

The function of the inverse fast Fourier transform network 68 is conventional and described in literature.

An output of the network 68 is applied to a frame buffer 70 and then to a digital to analog converter 72 having an output signal on a line 74 applied to the monitor 30. The output signal on the line 74 is the video signal given by the expression of block 32 with the motion induced component of block 33 minimized or removed. Thus, there is produced on the monitor 30 a display of the image received by the camera 10 with the effects of motion greatly reduced.

Referring to FIG. 3, there is shown an embodiment of the invention for use where the video camera 10 is mounted on a remote vehicle and the video monitor is at a central station spatially removed from the camera 10. The ground station is shown in block diagram in FIG. 4 and will be described. The system of FIG. 3 may typically be mounted in the RPV of FIG. 1. A video signal output from the camera 10, which includes a motion component, is applied by means of a cable 76 to an analog to digital converter 78 and to a two position solid state switch 80. Connected to one terminal of the switch 80 is a frame buffer 82 and connected to the second terminal is a frame buffer 84. The frame buffers of FIG. 3 are similar to the frame buffers previously described with reference to FIG. 2. They perform the same function of storing the digitized video signal having a motion component for further processing. Alternate frames of video date from the camera 10 are stored in alternate frame buffers 82 or 84. Thus, in the embodiment of FIG. 3, data from the camera 10 is processed on a frame basis.

Connected to the frame buffers 82 and 84 is a two-position electronic switch 86 that alternately connects the frame buffers to a digital mixer 88. Thus, one input to the digital mixer 88 is a frame by frame video signal with a motion component from the camera 10.

Also, input to the digital mixer 88 is the output of rate gyros 90 and 92 mounted to the camera 10 on mutually perpendicular axis and also on an axis perpendicular to the bore sight of the camera. The output of the gyro 92 is digitized in an analog to digital converter 94 and then applied to the digital mixer 88. Similarly, the output of the gyro 90 is digitized in an analog to digital converter 96 and also applied to the digital mixer 88. The digital mixer, as the name applied, mixes the video output of the camera 10 with the outputs of the rate gyros 90 and 92 for purposes of transmission to a remote processing station. The mixed signal output of the mixer 88 is applied to a transmitter 98 which generates a signal for transmission by means of an antenna 100 to the processing station.

To initialize the operation of the system of FIG. 3 on a frame by frame basis, a command signal is received at an antenna 102 and input to a command receiver 104 that generates a command signal to a controller 106 to start the operation of the system. In response to the command signal, the controller 106 generates a synchronization signal to the camera 10 and also synchronization signals to the electronic switches 80 and 86. In addition, the controller 106 generates read-out signals to the frame buffers 82 and 84. Basically, the command controller 106 is a clock responsive to the command signal that gnerates synchronization and read-out signals for operation of the system of FIG. 3.

Each time a synchronization signal is generated to the camera 10 to start a new frame of data, the electronic switches 80 and 86 are switched to an alternate position to connect one of the frame buffers to the camera to receive the next frame of video data and connecting the alternate frame buffer to the digital mixer 88 for combining with the output of the rate gyros 90 and 92. Since each frame of data must be motion corrected, the gyro signals for that frame of data must be timed to appear at the mixer 88 to mix the correct rate gyro signals with the associated frame of data. This mixing of the correct rate gyro signals with the associated frame of data is achieved by operation of the command controller 106. Thus, the signals transmitted from the antenna 100 to the processing station includes a series of data signals on a frame by frame basis mixed with the associated rate gyro signal to correct that frame of data.

Figure 4:
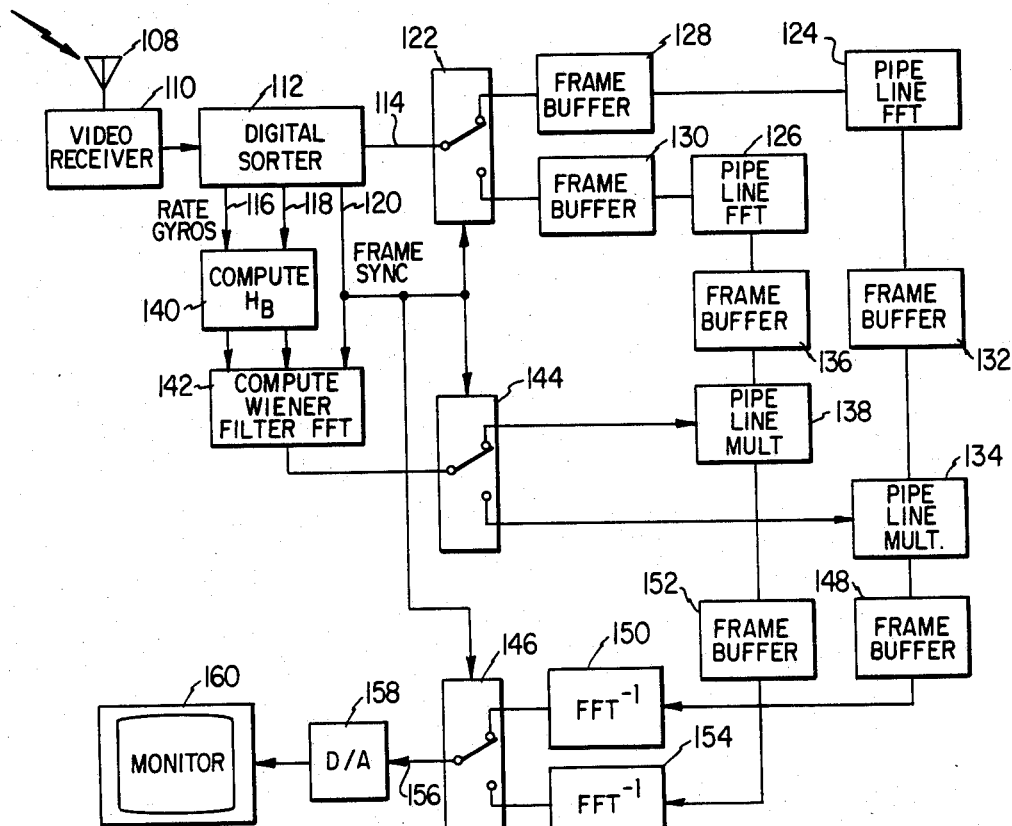
FIG. 4 is a block diagram of a ground station for receiving signals from the airborne system of FIG. 3 for processing it to a deblurred video display on a monitor.

Referring to FIG. 4, the camera and rate gyro signals transmitted from the antenna 100 are received by a processing station at an antenna 108. This antenna is connected to a video receiver 110 which demodulates the received signal into frames of digital data where each frame is mixed with motion correction signals from the rate gyros 90 and 92. This digital data on a frame by frame basis is applied to a digital sorter 112 which functions to separate the video signal, frame by frame, along with the motion component into one stream of data on a line 114 and the digitized rate gyro signals on lines 116 and 118 from the rate gyros 90 and 92, respectively, into second and third data streams. Also generated by the digital sorter 112 is a frame synchronization signal on a line 120.

The digital video signal from the camera 10 along with the motion component is applied to a two position electronic switch 122 which separates the signal frame by frame to be alternately applied to fast Fourier transform networks 124 or 126. The station of FIG. 4 processes the video data on a frame by frame basis in parallel paths such as the processing of the remote station as illustrated in FIG. 3. Interconnected between the fast Fourier transform network 124 and the switch 122 is a frame buffer 128 and interconnected between the network 126 and the switch is a frame buffer 130.

Connected to the fast Fourier transform network 124 is a frame buffer 132 which in turn is connected to a multiplier 134. In parallel therewith, an output of the Fourier transform network 126 connects to a frame buffer 136 which is then connected to a multipler 138. As explained with reference to FIG. 2, each frame of data from the video camera 10 is multiplied element by element, with a motion correction signal from the output of a Wiener filter.

The rate gyro signals on the lines 116 and 118 are connected to a computing network 140 which functions as previously described with reference to the computing network 54 of FIG. 2. Connected to the network 140 is the Wiener filter 142 that operates to generate a deblurring signal for motion correction of the output of the camera 10. This deblurring signal is applied to an electronic switch 144 having one terminal connected to the multiplier 138 and a second terminal connected to the multiplier 134.

To synchronize the frame by frame correction of the video camera signal, the frame synchronization on line 120 is applied to the electronic switches 122 and 144. By means of this synchronization, the correction signal for a particular frame of data will be applied to either the multiplier 138 or 134 in synchronization with the corresponding video frame data.

From the multiplier 134 the motion corrected video signal is applied to a frame buffer 148 for processing in an inverse fast Fourier transform network 150. Similarly, a frame of motion corrected data from the multiplier 138 is applied to a frame buffer 152 for processing in an inverse fast Fourier transform network 154. Thus, each output of the transform networks 150 and 154 is a motion corrected frame of video data.

Connected to the inverse fast Fourier transform networks 150 and 154 is a two position electronic switch 146 which is operated in synchronization with the switches 122 and 144 by the frame synchronization signal on line 120. By operation of the switch 146 alternate frames of video data, corrected for motion, are serially applied to a data line 156. The data line 156 carries all frames of video signal from the camera 10 each corrected for motion by means of the outputs of the rate gyros 90 and 92. This corrected frame by frame video signal is converted into an analog format by means of an analog to digital converter 158 having as an output a motion corrected video signal connected to a monitor 160. The monitor 160 displays the image seen by the camera 10 with the motion component greatly reduced.

Although the previous description has made reference to a remote pilotless vehicle, it will be understood that the invention is not limited to such an application. Video cameras are used in many applications where the video output of a camera includes a motion component. The systems of FIGS. 2, 3 and 4 will provide motion corrected displays for use in such applications. The distance between the camera and the processing station may require a radio link or the camera and the processing station may be hardwired interconnected. The invention is not limited to either one or the other of such operations.

While several embodiments of the present invention have been described in detail therein and shown in the accompanying drawings, it will evident that various further modifications are possible without departing from the scope of the invention.

We claim:

1. A method for correcting a video image for motion induced blurring, comprising the steps of:
   measuring the motion of a video camera and generating a motion signal,
   generating a video camera signal from the video camera, the video camera signal including a blurring component,
   computing a video deblurring signal from the motion signal, and
   combining the video deblurring signal with the video camera signal to generate a motion corrected video signal.

2. A method of correcting a video image for motion induced blurring as set forth in claim 1 wherein the step of computing includes computing a motion blurring signal and using the motion blurring signal to generate a Fourier transform of the video deblurring signal.

3. A method of correcting a video image for motion induced blurring as set forth in claim 1 wherein the step of combining the video deblurring signal with the video camera signal includes:
   generating a Fourier transform of the video camera signal,
   multiplying the output of the Fourier transform with a Fourier transform of a Wiener filter, and
   generating an inverse Fourier transform of a signal resulting from the step of multiplying, the result of the inverse Fourier transform providing the motion corrected video signal.

4. A method of correcting a video image for motion induced blurring as set forth in claim 1 wherein the generated motion signal and the generated video camera signal are in an analog format, and including the step of:
   converting the analog motion signal and the analog video camera signal into a digital format for the step of computing and the step of combining.

5. A method for correcting a video image for motion induced blurring, comprising the steps of:
   measuring the motion of a video camera along a first axis perpendicular to a bore sight of the camera to generate a first motion signal,
   measuring the motion of a video camera along a second axis perpendicular to the bore sight of the camera and perpendicular to the first axis to generate a second motion signal,
   generating a video camera signal from the video camera, the video camera signal including a blurring component,
   computing a video deblurring signal from the first motion signal and the second motion signal, and
   combining the video deblurring signal with the video camera signal to generate a motion corrected video signal.

6. A method of correcting a video image for motion induced blurring as set forth in claim 5 wherein the step of computing includes computing an equivalent motion blurring component signal from the first and second motion signals.

7. A method of correcting a video image for motion induced blurring as set forth in claim 6 wherein the step of computing further includes filtering the equivalent motion blurring component signal to compute the video deblurring signal.

8. A method of correcting a video image for motion induced blurring as set forth in claim 7 wherein the step of filtering the equivalent motion blurring component signal is completed by Wiener filtering.

9. A method for remotely correcting a video image for motion induced blurring, comprising the steps of:
   measuring the motion of a video camera and generating a motion signal,
   generating a video camera signal from the video camera, the video camera signal including a blurring component,
   mixing the video camera signal with the motion signal into a transmission signal for radio link transmission to a processing station,
   sorting the transmission signal at the processing station into a received motion signal and a received video camera signal,
   computing a video deblurring signal from the received motion signal, and
   combining the video deblurring signal with the received video camera signal to generate a motion corrected video signal.

10. A method for remotely correcting a video image as set forth in claim 9 wherein the step of computing includes computing a motion correction signal, and filtering the motion correction signal to generate the video deblurring signal.

11. A method for remotely correcting a video image as set forth in claim 10 wherein filtering the motion correction signal includes performing a Wiener filtering operation of the motion correction signal.

12. A method for remotely correcting a video image as set forth in claim 9 wherein the step of measuring the motion of the video camera includes measuring the rate of motion of the camera and generating a rate motion signal for mixing with the video camera signal.

13. A method for remotely correcting a video image for motion induced blurring, comprising the steps of:
   measuring the motion of a video camera at a remote location along a first axis perpendicular to a bore sight of the camera to generate a first motion signal,
   measuring the motion of the video camera along a second axis perpendicular to the bore sight of the camera and perpendicular to the first axis to generate a second motion signal,
   generating a video camera signal from the video camera, the video signal including a blurring component,
   mixing the video camera signal with the first motion signal and the second motion signal into a transmission signal for radio link transmission to a processing station,
   sorting the transmission signal at the processing station into a first received motion signal, a second received motion signal and a received video camera signal,
   computing a video deblurring signal from the first received motion signal and the second received motion signal, and
   combining the video deblurring signal with the received video camera signal to generate a motion corrected video signal.

14. A method for remotely correcting a video image as set forth on claim 13 wherein the step of combining the video deblurring signal with the received video camera signal includes:
   generating a Fourier transform of the received video camera signal,
   multiplying the results of the Fourier transform with the video deblurring signal to generate a multiplication signal, and
   generating an inverse Fourier transform of the multiplication signal to generate the motion corrected video signal.

15. A method for remotely correcting a video image as set forth in claim 14 wherein the step of computing a video deblurring signal includes:
   computing an equivalent of the blurring component from the first received motion signal and the second received motion signal, and
   filtering the equivalent blurring component to generate the video deblurring signal.

16. A method for remotely correcting a video image as set forth in claim 13 wherein the video camera is mounted on a remote pilotless vehicle, and the steps of measuring the motion of the video camera along a first axis and measuring the motion of the video camera along a second axis includes generating a first rate motion signal and a second rate motion signal.

17. Apparatus for correcting a video image for motion induced blurring, comprising:
   a video camera including means for generating a video camera signal, the video camera signal having a motion blurring component,
   means for measuring the motion of said camera and generating a motion signal,
   signal correction means connected to said video camera for receiving the video camera signal and connected to the means for measuring for receiving the motion signal, said signal correction means responsive to the video camera signal and the motion signal for combining into a motion corrected video signal.

18. Apparatus for correcting a video image for motion induced blurring as set forth in claim 17 wherein said signal correcting means includes a filter responsive to the motion signal for generating video deblurring signal, and
   means for combining the video deblurring signal with the video camera signal to generate the motion corrected video signal.

19. Apparatus for correcting a video image for motion induced blurring as set forth in claim 17 wherein said means for measuring includes:
   means for measuring the motion of the video camera along a first axis perpendicular to the bore sight of the camera to generate a first motion signal, and
   means for measuring the motion of the video camera along a second axis perpendicular to the bore side of the camera and perpendicular to the first axis to generate a second motion signal, the first motion signal and the second motion signal comprising the generated camera motion signal.

20. Apparatus for correcting a video image for motion induced blurring as set forth in claim 19 wherein said signal correcting means includes:
   means for computing a video deblurring signal from the first motion signal and the second motion signal, and
   means for combining the video deblurring signal with the video camera signal to generate the motion corrected video signal.

21. Apparatus for correcting a video image for motion induced blurring as set forth in claim 20 wherein said means for computing a video deblurring signal includes:
   means for computing an equivalent motion blurring component in response to the first motion signal and the second motion signal, and
   means for filtering the equivalent motion blurring component to generate the video deblurring signal.

22. Apparatus for correcting a video image for motion induced blurring as set forth in claim 21 wherein said means for filtering includes a Wiener filter.

23. Apparatus for correcting a video image for motion induced blurring as set forth in claim 22 wherein said Wiener filter generates the video deblurring signal in accordance with the expression:

$$\frac{H_B}{|H_B|^2 + N_n/N_s},$$

where, $H_B$ is the equivalent motion blurring component, and $N_n/N_s$ is a noise-to-signal ratio.

24. Apparatus for correcting a video image for motion induced blurring, comprising:
   a video camera at a remote location and including means for generating a video camera signal, the video camera signal having a motion blurring component,
   means for measuring the motion of said camera and generating a motion signal,
   means for mixing the video camera and the motion signal to generate a video/motion signal, a transmitter responsive to the video/motion signal for generating a transmission signal for transmission to a processing station, a receiver at the processing station receiving the transmission signal for sorting into a received motion signal and a received video camera signal, and processing means responsive to the received motion signal and the received video camera signal for combining into a motion corrected video image.

25. Apparatus for correcting a video image for motion induced blurring as set forth in claim 24 wherein said processing means includes a plurality of processing channels each responsive to the received motion signal for an identified frame of data and the received video signal for the identified frame of data from said remote location for combining into a motion corrected video signal for the remote location.

26. Apparatus for correcting a video image for motion induced blurring as set forth in claim 24 wherein said processing means includes a filter responsive to the received motion signal for generating a video deblurring signal, and means for combining the video deblurring signal with the received video signal to generate the motion corrected video image.

27. Apparatus for correcting a video image for motion induced blurring as set forth in claim 26 wherein said filter comprising a Wiener filter generating the video deblurring signal in accordance with the expression:

$$\frac{H_B}{|H_B|^2 + N_n/N_s},$$

where, $H_B$ is the equivalent of the motion blurring component, and $N_n/N_s$ is a noise-to-signal ratio.

28. Apparatus for correcting a video image for motion induced blurring as set forth in claim 24 including a command receiver at said remote location responsive to a command signal, and a command controller connected to the command receiver and generating a synchronization signal to said video camera and control signals to said means for mixing.

* * * * *